(12) United States Patent
Jung et al.

(10) Patent No.: US 12,289,760 B2
(45) Date of Patent: Apr. 29, 2025

(54) METHOD AND APPARATUS FOR MANAGING THE TRANSMISSION OF A FEEDBACK MESSAGE

(71) Applicant: Lenovo (Singapore) Pte. Ltd., New Tech Park (SG)

(72) Inventors: Hyejung Jung, Northbrook, IL (US); Karthikeyan Ganesan, Nauheim (DE); Vijay Nangia, Woodridge, IL (US); Hossein Bagheri, Urbana, IL (US)

(73) Assignee: Lenovo (Singapore) Pte. Ltd., New Tech park (SG)

( * ) Notice: Subject to any disclaimer, the term of this patent is extended or adjusted under 35 U.S.C. 154(b) by 411 days.

(21) Appl. No.: 17/764,962

(22) PCT Filed: Nov. 9, 2020

(86) PCT No.: PCT/IB2020/060540
§ 371 (c)(1),
(2) Date: Mar. 29, 2022

(87) PCT Pub. No.: WO2021/090298
PCT Pub. Date: May 14, 2021

(65) Prior Publication Data
US 2022/0377796 A1    Nov. 24, 2022

Related U.S. Application Data

(60) Provisional application No. 62/933,345, filed on Nov. 8, 2019.

(51) Int. Cl.
*H04W 74/0816*    (2024.01)
*H04L 1/1812*    (2023.01)
(Continued)

(52) U.S. Cl.
CPC ....... *H04W 74/0816* (2013.01); *H04L 1/1812* (2013.01); *H04W 72/1263* (2013.01); *H04W 74/004* (2013.01)

(58) Field of Classification Search
CPC ......... H04W 74/0816; H04W 72/1263; H04W 74/004; H04L 1/1812
See application file for complete search history.

(56) References Cited

U.S. PATENT DOCUMENTS

2019/0150007 A1*    5/2019    Frenne ................ H04W 72/542
                                                                    370/252
2020/0296796 A1*    9/2020    Uchiyama ............. H04W 72/02
(Continued)

FOREIGN PATENT DOCUMENTS

| WO | 2017052345 A1 | 3/2017 |
| WO | 2017168257 A1 | 10/2017 |
| WO | 2017171299 A1 | 10/2017 |

OTHER PUBLICATIONS

PCT International Search Report for PCT/IB2020/060540, Lenovo (Singapore) Pte. Ltd., mailing date—Feb. 15, 2021.
(Continued)

*Primary Examiner* — Michael J Moore, Jr.
(74) *Attorney, Agent, or Firm* — FIG. 1 Patents

(57) ABSTRACT

A method and apparatus are provided, in which information of a feedback time for transmitting a feedback message from the user equipment for a physical shared channel message is received (402). A maximum allowed feedback time delay associated with the feedback message for the physical shared channel message is determined (404). A physical channel occasion available to be used by the user equipment for transmitting the feedback message is identified (406). The feedback message is transmitted when the identified available physical channel occasion, which is available to be used for the feedback message, allows for the feedback
(Continued)

message to be transmitted within the maximum allowed feedback time delay, otherwise the feedback message is not transmitted, when the identified available physical channel occasion does not allow for the feedback message to be transmitted within the maximum allowed feedback time delay (408).

20 Claims, 6 Drawing Sheets

(51) Int. Cl.
*H04W 72/1263* (2023.01)
*H04W 74/00* (2009.01)

(56) References Cited

U.S. PATENT DOCUMENTS

| | | | | |
|---|---|---|---|---|
| 2020/0336252 | A1* | 10/2020 | Lin | H04L 1/1864 |
| 2020/0403735 | A1* | 12/2020 | Zhao | H04L 1/1896 |
| 2020/0412509 | A1* | 12/2020 | Zhou | H04W 72/0446 |
| 2021/0051665 | A1* | 2/2021 | Fakoorian | H04L 1/1829 |
| 2021/0127413 | A1* | 4/2021 | Lu | H04W 72/21 |
| 2021/0135946 | A1* | 5/2021 | Babaei | H04L 1/1896 |
| 2022/0263608 | A1* | 8/2022 | Wei | H04L 1/1896 |
| 2022/0377796 | A1* | 11/2022 | Jung | H04W 72/1263 |
| 2024/0154730 | A1* | 5/2024 | Dimou | H04L 1/1854 |

OTHER PUBLICATIONS

3GPP TS 22.104 V16.3.0 (Sep. 2019), 3rd Generation Partnership Project; Technical Specification Group Services and System Aspects; Service requirements for cyber-physical control applications in vertical domains; Stage 1 (Release 16).
3GPP TS 38.211 V15.7.0 (Sep. 2019), 3rd Generation Partnership Project; Technical Specification Group Radio Access Network; NR; Physical channels and modulation (Release 15).
3GPP TS 38.213 V15.7.0 (Sep. 2019), 3rd Generation Partnership Project; Technical Specification Group Radio Access Network; NR; Physical layer procedures for control (Release 15).
3GPP TS 38.214 V15.7.0 (Sep. 2019), 3rd Generation Partnership Project; Technical Specification Group Radio Access Network; NR; Physical layer procedures for data (Release 15).
3GPP TS 38.321 V15.7.0 (Sep. 2019), 3rd Generation Partnership Project; Technical Specification Group Radio Access Network; NR; Medium Access Control (MAC) protocol specification (Release 15).
3GPP TS 38.331 V15.7.0 (Sep. 2019), 3rd Generation Partnership Project; Technical Specification Group Radio Access Network; NR; Radio Resource Control (RRC) protocol specification (Release 15).
RAN1 Chairman's Notes RAN WG1 #97 meeting, Reno, USA, May 13-17, 2019, entitled "Final Report of 3GPP TSG RAN WG1 #97 v1.0.0", R1-1907973.
RAN1 Chairman's Notes RAN WG1 #98 meeting, Prague, Czech Rep, Aug. 26-30, 2019, entitled "Final Report of 3GPP TSG RAN WG1 #98 v2.0.0", R1-1911429.
RAN1 Chairman's Notes RAN WG1 #98.bis meeting, Chongqing, China, Oct. 14-20, 2019, entitled "Draft Report of 3GPP TSG RAN WG1 #98.bis v0.1.0", R1-191xxxx.
CATT, "HARQ and scheduling timing design for LTE sTTI", R1-1707446, for 3GPP TSG RAN Meeting #89, Hangzhou, China, May 15-19, 2017.
RAN WG1, "Reply LS on SPS/CG for IIoT", R1-1907961, for 3GPP TSG RAN WG1 #97, Reno, NV, US, May 13-17, 2019.

* cited by examiner

```
-- ASN1START
-- TAG-SPS-CONFIG-START

SPS-Config ::=            SEQUENCE {
    periodicity               ENUMERATED{ms10, ms20, ms32, ms40, ms64, ms80, ms128, ms160, ms320,
                                         ms640, spare6, spare5, spare4, spare3, spare2, spare1},
    nrofHARQ-Processes        INTEGER (1..8),
    n1PUCCH-AN                PUCCH-ResourceId                                 OPTIONAL,  -- Need M
    mcs-Table                 ENUMERATED {qam64LowSE}                          OPTIONAL,  -- Need S
    ...
}

-- TAG-SPS-CONFIG-STOP
-- ASN1STOP
```

SPS-CONFIG INFORMATION ELEMENT

FIG. 2

| SPS-CONFIG FIELD DESCRIPTIONS |
|---|
| mcs-Table<br>Indicates the MCS table the UE shall use for DL SPS (see TS 38.214 [19],clause 5.1.3.1. If present, the UE shall use the MCS table of low-SE 64 QAM table indicated in Table 5.1.3.1-3 of TS 38.214 [19]. If this field is absent and field mcs-table in PDSCH-Config is set to 'qam256' and the activating DCI is of format 1_1, the UE applies the 256QAM table indicated in Table 5.1.3.1-2 of TS 38.214 [19]. Otherwise,the UE applies the non-low-SE 64 QAM table indicated in Table 5.1.3.1-1 of TS 38.214 [19]. |
| n1PUCCH-AN<br>HARQ resource for PUCCH for DL SPS. The network configures the resource either as format0 or format1. The actual PUCCH-Resource is configured in PUCCH-Config and referred to by its ID. See TS 38.213 [13], clause 9.2.3. |
| nrofHARQ-Processes<br>Number of configured HARQ processes for SPS DL (see TS 38.321 [3], clause 5.8.1). |
| periodicity<br>Periodicity for DL SPS (see TS 38.214 [19] and TS 38.321 [3], clause 5.8.1). |

METHOD AND APPARATUS FOR MANAGING THE TRANSMISSION OF A FEEDBACK MESSAGE

FIELD OF THE INVENTION

The present disclosure is directed to managing the transmission of a feedback message, including a feedback message from the user equipment related to a physical shared channel message. In some instances, the feedback can involve a hybrid automatic repeat request-acknowledgement (HARQ-ACK) feedback for enhanced downlink (DL) semi-persistent scheduling (SPS).

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Evolved Universal Terrestrial Radio Access (E-UTRA), Long Term Evolution (LTE), Universal Mobile Telecommunications Service (UMTS), Global System for Mobile Communication (GSM), and/or Enhanced Data GSM Environment (EDGE).

In an attempt to support ultra-reliable low latency communications, as well as an increase in periodic and/or persistent small packet reporting, the use of semi persistent scheduling is being increasingly utilized. Semi-persistent scheduling can benefit from an associated reduction of control channel overhead for applications that require persistent radio resource allocations. However, the related expected acknowledgements can sometimes have difficulty timely identifying an available uplink resource for sending the expected acknowledgement within the expected response window. In some instances, an acknowledgement may not be able to be sent within the expected allowable response window. Correspondingly, such a response may be ineffective in timely providing the expected acknowledgement.

The present inventor have recognized that it may be beneficial to be able to skip the transmission of the expected feedback message, in instances where it would be received outside of the allowable expected window of receipt, which in turn allows the device to avoid using resources relative to a response message in instances during which a timely response may not be possible, such that the response message can be acted upon as expected by the intended recipient.

SUMMARY

The present application provides a method in a user equipment. The method includes receiving, by the user equipment, information of a feedback time for transmitting a feedback message from the user equipment for a physical shared channel message. A maximum allowed feedback time delay associated with the feedback message for the physical shared channel message is determined. A physical channel occasion available to be used by the user equipment for transmitting the feedback message is identified. The feedback message is transmitted by the user equipment when the identified available physical channel occasion, which is available to be used for the feedback message, allows for the feedback message to be transmitted within the maximum allowed feedback time delay, otherwise the feedback message is not transmitted, when the identified available physical channel occasion does not allow for the feedback message to be transmitted within the maximum allowed feedback time delay.

According to another possible embodiment, a user equipment is provided. The user equipment includes a transceiver that receives information of a feedback time for transmitting a feedback message from the user equipment for a physical shared channel message. The user equipment further includes a controller that determines a maximum allowed feedback time delay associated with the feedback message for the physical shared channel message, and identifies a physical channel occasion available to be used by the user equipment for transmitting the feedback message. The feedback message is transmitted via the transceiver of the user equipment when the identified available physical channel occasion, which is available to be used for the feedback message, allows for the feedback message to be transmitted within the maximum allowed feedback time delay, otherwise the feedback message is not transmitted, when the identified available physical channel occasion does not allow for the feedback message to be transmitted within the maximum allowed feedback time delay.

These and other objects, features, and advantages of the present application are evident from the following description of one or more preferred embodiments, with reference to the accompanying drawings.

BRIEF DESCRIPTION OF THE DRAWINGS

FIG. 2 is a listing of an exemplary SPS-Config listing element as identified in 3GPP technical specification 38.331;

FIG. 3 is a table, which identifies the field description related to fields identified in the exemplary SPS-Config listing element identified in FIG. 2;

DETAILED DESCRIPTION OF THE PREFERRED EMBODIMENT(S)

Figure 1:
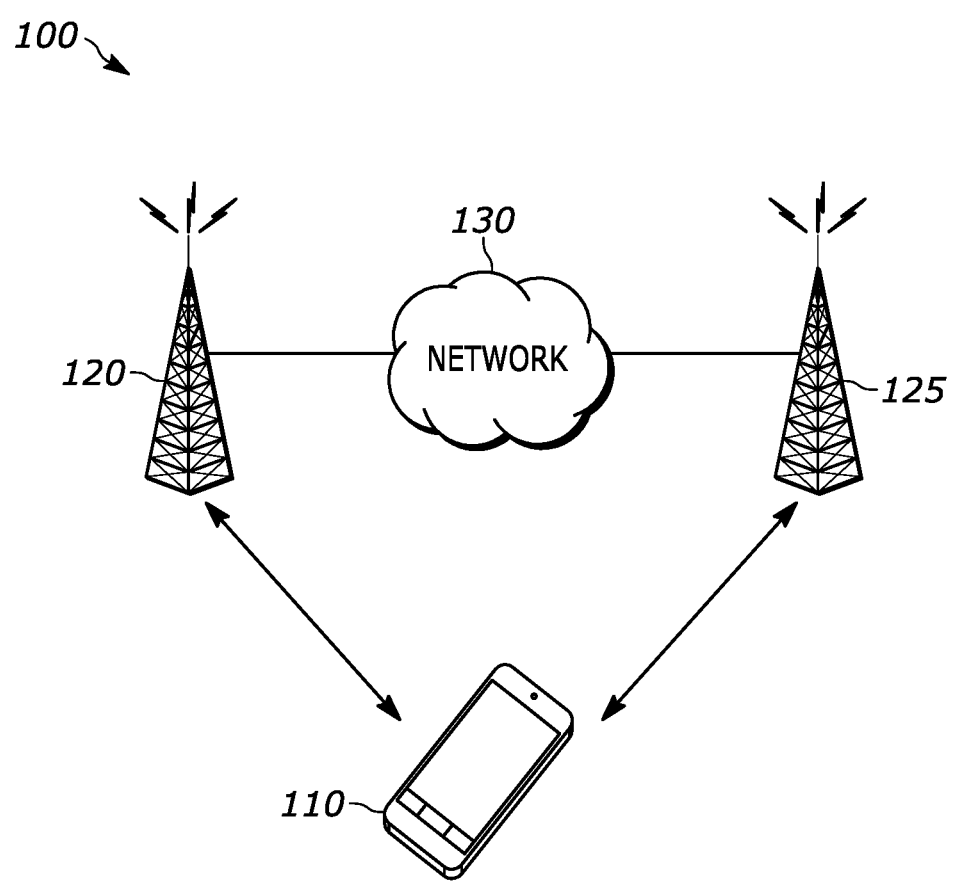
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments can provide for the management of the transmission of a feedback message, including a feedback message from the user equipment related to a physical shared channel message. In some instances, the feedback can involve a hybrid automatic repeat request-acknowledgement (HARQ-ACK) feedback for enhanced downlink (DL) semi-persistent scheduling (SPS).

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

DL SPS enhancements have been discussed in order for 3GPP Rel-16 New Radio (NR) to more efficiently support periodic traffic of various ultra-reliable low-latency communication (URLLC) use cases such as power distribution, factory automation, and transport industry (including remote driving). Multiple simultaneous active downlink (DL) semi-persistent scheduling (SPS) configurations for a given bandwidth part (BWP) can reduce the scheduling delay by providing more frequent transmission opportunities as well as can support multiple different service types for a UE.

In 3GPP Rel-15 NR, with a SPS configuration, a UE is semi-statically configured with a physical uplink control channel (PUCCH) resource index for hybrid automatic repeat request acknowledgement (HARQ-ACK) feedback to a SPS physical downlink shared channel (PDSCH). Further, the UE identifies PDSCH-to-HARQ feedback delay in terms of a number of slots from the PDSCH-to-HARQ feedback timing indicator field in downlink control information (DCI) format 1_0 or, if present, in DCI format 1_1 activating the SPS PDSCH reception, and determines a slot where the UE transmits HARQ-ACK information for a given SPS PDSCH.

In 3GPP Rel-16 NR, a UE can be configured with multiple DL SPS configurations for a given BWP, and more than one SPS configuration for the UE can be active at a given time at a given serving cell. If a periodicity of a DL SPS configuration is set to a small value (e.g. 1 slot, 1 ms, 0.5 ms) and/or if multiple DL SPS configurations are active, the UE is expected to transmit HARQ-ACK feedback to SPS PDSCHs very frequently according to a semi-statically configured pattern (i.e. based on the semi-statically configured PUCCH resource index and PDSCH-to-HARQ feedback delay). However, with dynamic time division duplex (TDD) operations in non-paired spectrum, it may be difficult to guarantee uplink (UL) regions for semi-statically configured HARQ-ACK transmissions.

This disclosure presents procedures for a UE to provide HARQ-ACK feedback to SPS PDSCHs of one or more DL SPS configurations with short periodicities and methods to help better ensure communication service availability for periodic deterministic communication services.

Under dynamic TDD operation, deferring HARQ-ACK of SPS PDSCHs until the first available valid PUCCH resource or the first available valid slot (i.e. UL slot configured via semi-static TDD configuration) may be considered to better solve the issue of unavailable UL resources for HARQ-ACK feedback. However, unbounded HARQ-ACK feedback delay may make transmitted HARQ-ACK information less useful to a network entity.

According to Rel-15 3rd generation partnership project (3GPP) NR specs (TS 38.321, TS 38.331), a DL SPS configuration has the following information and DL SPS occasions are determined as follows:

As provided in 3GPP TS 38.321

5.8 TRANSMISSION AND RECEPTION WITHOUT DYNAMIC SCHEDULING 5.8.1 Downlink

Semi-Persistent Scheduling (SPS) is configured by radio resource control (RRC) per Serving Cell and per BWP. Activation and deactivation of the DL SPS are independent among the Serving Cells.

For the DL SPS, a DL assignment is provided by physical downlink control channel (PDCCH), and stored or cleared based on L1 signaling indicating SPS activation or deactivation.

RRC configures the following parameters when SPS is configured:
  cs-RNTI: CS-RNTI for activation, deactivation, and retransmission;
  nrofHARQ-Processes: the number of configured HARQ processes for SPS;
  periodicity: periodicity of configured downlink assignment for SPS.

When SPS is released by upper layers, all the corresponding configurations shall be released.

After a downlink assignment is configured for SPS, the medium access control (MAC) entity shall consider sequentially that the $N^{th}$ downlink assignment occurs in the slot for which:

(numberOfSlotsPerFrame×SFN+slot number in the frame)=[(numberOfSlotsPerFrame× $SFN_{start\ time}$+$slot_{start\ time}$)+$N$×periodicity×numberOfSlotsPerFrame/10]modulo(1024×numberOfSlotsPerFrame)

where $SFN_{start\ time}$ and $slot_{start\ time}$ are the system frame number (SFN) and slot, respectively, of the first transmission of PDSCH where the configured downlink assignment was (re-)initialized.

SPS-Config

The IE SPS-Config is used to configure downlink semi-persistent transmission. Downlink SPS may be configured on the SpCell as well as on SCells. The network ensures SPS-Config is configured for at most one cell in a cell group.

FIG. 2 illustrates a listing 200 of an exemplary SPS-Config listing element as identified in 3GPP technical specification 38.331. FIG. 3 illustrates a table 300, which identifies the field description related to fields identified in the exemplary SPS-Config listing element identified in FIG. 2.

During RAN1 #97, #98, and #98bis meetings, radio layer 1 (RAN1) made the following agreements regarding DL SPS enhancements for Rel-16 NR enhanced URLLC:

RAN1 #97 (Reno, May 2019),
see RAN1 Chairman's Notes, RAN WG1 #97 meeting, Reno, USA, May, 2019
Agreement:
  Regarding Q1 in the LS in R1-1905940:
    Although RAN1 has not completely analyzed the potential impact of supporting up to 16 SPS configurations for a given BWP of a serving cell, RAN1 has the understanding that 8 SPS configurations for a given BWP of a serving cell is sufficient in Rel-16

Agreement:
Regarding Q2 in LS from RAN2, the following is captured:
RAN1 discussed the feasibility of support of shorter periodicities for DL SPS, it is feasible to support periodicity down to 1 slot for all SCSs and single SPS configuration with certain constraints related to HARQ-ACK feedback and combinations of DL & UL SCSs The agreements were informed to RAN2 in a Reply LS in R1-1907961.

RAN1 #98 (Prague, August 2019)
see RAN1 Chairman's Notes, RAN WG1 #98 meeting, Prague, CZ, August, 2019

Agreements:
For cases where only HARQ-ACK feedback for SPS PDSCHs shall be reported (i.e. no dynamic PDSCH HARQ-ACK), support more than one bit of HARQ-ACK feedback for SPS PDSCH without an associated grant in a PUCCH resource
FFS applicability to all PUCCH formats
FFS the number of bits, e.g., the # of configured/activated SPS configurations, etc.
FFS how to construct both type-1 and type-2 HARQ-ACK codebook for cases where HARQ-ACK feedback for SPS PDSCH is multiplexed with dynamic PDSCH HARQ-ACK Conclusion:
There is no consensus to support joint activation in a DCI for two or more SPS configurations for a given BWP of a serving cell in rel-16.

Conclusion:
There is no consensus on support of DL SPS periodicity shorter than 1 slot in Rel-16.

Working assumption:
Support joint release in a DCI for two or more SPS configurations for a given BWP of a serving cell
Reusing the joint release mechanism as that defined for UL type 2 CG RAN1 #98bis (Chongqing, October 2019)
see RAN1 Chairman's Notes, RAN WG1 #98bis meeting, Chongqing, China, October, 2019

Agreements:
Confirm the following working assumption:
Working assumption:
Support joint release in a DCI for two or more SPS configurations for a given BWP of a serving cell Agreements:
For cases where only HARQ-ACK feedback for SPS PDSCHs shall be reported (i.e. no dynamic PDSCH HARQ-ACK), PUCCH formats 2/3/4 are applicable in addition to PUCCH formats 0/1.

Agreements:
For cases where HARQ-ACK feedback for SPS PDSCH is multiplexed with HARQ-ACK feedback for dynamic scheduled PDSCH, the PUCCH resource to be used is determined by reusing rel-15 mechanism.

Agreements:
For cases where only HARQ-ACK feedback for SPS PDSCHs shall be reported (i.e. no dynamic PDSCH HARQ-ACK), RAN1 down-selects the following options:
Option 1: Multiple PUCCH resources are configured common for all SPS configurations (similar to multi-CSI-PUCCH-ResourceList) per HARQ-ACK codebook. The actual PUCCH resource to be used among PUCCH resources is determined based on HARQ-ACK payload size
FFS: Number of maximum PUCCH resources
FFS details (threshold for determining PUCCH resource)
Option 2: Multiple PUCCH resource sets are configured common for all SPS configurations per HARQ-ACK codebook. The PUCCH resource set to be used is determined based on HARQ-ACK payload size.
FFS whether or not to configure PUCCH resource sets separately from PUCCH resource set for dynamic-scheduled PDSCH
FFS whether to configure separate payload range
The actual PUCCH resource to be used among PUCCH resources in the chosen PUCCH resource set is determined by reusing rel-15 HARQ-ACK PUCCH resource determination mechanism for dynamic PDSCH based on the latest activation DCI Agreements:
For cases where only HARQ-ACK feedback for SPS PDSCHs without associated DL assignment shall be reported (i.e. no dynamic PDSCH HARQ-ACK),
Multiple PUCCH resources are configured common for all SPS configurations per HARQ-ACK codebook. The actual PUCCH resource to be used among PUCCH resources is determined based on HARQ-ACK payload size
Number of PUCCH resources is up to 4
FFS details (e.g., threshold for determining PUCCH resource)

Agreements:
For cases where only HARQ-ACK feedback for SPS PDSCHs without associated DL assignment shall be reported (i.e. no dynamic PDSCH HARQ-ACK), PUCCH resource i is selected if HARQ-ACK payload size (not including CRC) is in the range of $\{N_{i,min}, \ldots, N_{i,max}\}$ bits, where the number of PUCCH resources in the selection is from 0 up to 3.
$N_{0,min}=1$, $N_{0,max}=2$
For $i \neq 0$
$N_{i,max}$ is configured by RRC; if not configured, $N_{i,max}$ is 1706.
$N_{i,min}$ is equal to $N_{i-1,max}+1$
Note: The above mechanism is equivalent to rel-15 procedure when a single PUCCH resource is configured per PUCCH resource set.

Agreements:
For cases where only HARQ-ACK feedback for SPS PDSCHs without associated DL assignment shall be reported (i.e. no dynamic PDSCH HARQ-ACK), the number of PRBs for the PUCCH transmission is determined by reusing rel-15 mechanism in Subclause 9.2.3 (UE procedure for reporting HARQ-ACK) of 38.213.
The maximum code rate per PUCCH format is reused from the parameter associated with the identified HARQ-ACK codebook for SPS PDSCH
According to 9.2.3 of 3GPP TS 38.213, "If a UE transmits a PUCCH with $O_{ACK}$ HARQ-ACK information bits and $O_{CRC}$ bits using PUCCH format 2 or PUCCH format 3 in a PUCCH resource that includes $M_{RB}^{PUCCH}$ PRBs, the UE determines a number of PRBs $M_{RB,min}^{PUCCH}$ for the PUCCH transmission to be the minimum number of PRBs, that is smaller than or equal to a number of PRBs $M_{RB}^{PUCCH}$ provided respectively by nrofPRBs of PUCCH-format2 or nrofPRBs of PUCCH-format3 and start from the first PRB from the number of PRBs, that results to $(O_{ACK}+O_{CRC})$ $\leq M_{RB,min}^{PUCCH} \cdot N_{sc,ctrl}^{RB} \cdot N_{symb-UCI}^{PUCCH} \cdot Q_m \cdot r$ and, if $M_{RB}^{PUCCH} > 1$, $(O_{ACK} + O_{CRC}) > (M_{RB,min}^{PUCCH} - 1) \cdot N_{sc,ctrl}^{RB} \cdot N_{symb-UCI}^{PUCCH} \cdot Q_m \cdot r$, where $N_{sc,ctrl}^{RB}$, $N_{symb-UCI}^{PUCCH}$, $Q_m$, and r are defined in Subclause 9.2.5.2. For PUCCH format 3, if $M_{RB,min}^{PUCCH}$ is not equal $2^{\alpha_2} \cdot 3^{\alpha_3} \cdot 5^{\alpha_5}$ according to [4, TS 38.211], $M_{RB,min}^{PUCCH}$ is increased to the nearest allowed value of nrofPRBs for PUCCH-format3 [12, TS 38.331]. If $(O_{ACK} + O_{CRC}) > (M_{RB}^{PUCCH} - 1) \cdot N_{sc,ctrl}^{RB} \cdot N_{symb-UCI}^{PUCCH} \cdot Q_m \cdot r$, the UE transmits the PUCCH over $M_{RB}^{PUCCH}$ PRBs."

In accordance with the present filing, the following embodiments are proposed.

HARQ-ACK Feedback Delay for DL SPS with Short Frequency

According to 3GPP TS 22.104, a system for Industrial Internet of Things (IIoT) communications is considered unavailable to the cyber-physical application when an expected message is not received (e.g. transfer time (actual latency) is greater than the maximum end-to-end latency) by the application after application's survival time expires. The followings are definitions of performance related metrics:

communication service availability: percentage value of the amount of time the end-to-end communication service is delivered according to an agreed quality of service (QoS), divided by the amount of time the system is expected to deliver the end-to-end service according to the specification in a specific area.

NOTE 2: The end point in "end-to-end" is assumed to be the communication service interface.

NOTE 3: The communication service is considered unavailable if it does not meet the pertinent QoS requirements. If availability is one of these requirements, the following rule applies: the system is considered unavailable if an expected message is not received within a specified time, which, at minimum, is the sum of maximum allowed end-to-end latency and survival time.

survival time: the time that an application consuming a communication service may continue without an anticipated message.

end-to-end latency: the time that takes to transfer a given piece of information from a source to a destination, measured at the communication interface, from the moment it is transmitted by the source to the moment it is successfully received at the destination.

transfer interval: time difference between two consecutive transfers of application data from an application via the service interface to 3GPP system.

According to Table 5.2-1 of 3GPP TS 22.104, depending on applications, periodic deterministic communication services may have transfer intervals of 0.5 ms, 1 ms, 2 ms, 10 ms, and 50 ms, and may have survival time same as the transfer interval or three times as long as the transfer interval.

According to one embodiment, with the concept of survival time explained above, delaying HARQ-ACK feedback beyond a certain time may not be useful, since the communication service may be considered unavailable after survival time. Thus, it may be beneficial that a network entity (e.g. gNB) semi-statically or semi-persistently configures a UE with the maximum allowed time duration of delaying HARQ-ACK feedback for a given SPS PDSCH or a set of consecutive SPS PDSCHs (from the same or different SPS configurations), taking into account survival time of applications and end-to-end latency. The time duration for delaying HARQ-ACK feedback with respect to original HARQ-ACK feedback timing may be indicated as one or more of a number of SPS PDSCH occasions of a DL SPS configuration, as a number of PUCCH occasions for HARQ-ACK feedback to SPS PDSCHs associated with one or more activated DL SPS configurations, or as a number of time units (e.g. slots, symbols). If the UE cannot transmit HARQ-ACK information within the semi-statically or semi-persistently configured maximum HARQ-ACK feedback delay, the UE may discard the HARQ-ACK information. In one example, the time duration for delaying HARQ-ACK feedback can be further based on the periodicity of the SPS configuration.

Further, the UE may receive an indication of a maximum allowed number of missing HARQ-ACK feedbacks and count the number of SPS PDSCHs for which the UE were not able to perform HARQ-ACK transmissions within the configured maximum HARQ-ACK feedback delay. If the number of missing HARQ-ACK feedbacks is larger than the indicated maximum allowed number of missing HARQ-ACK feedbacks, the UE may autonomously release SPS for the one or more associated activated DL SPS configurations. In one implementation, the UE counts the number of missing HARQ-ACK feedbacks per activated DL SPS configuration, and determines SPS release individually for each DL SPS configuration. In another implementation, the UE counts the number of missing HARQ-ACK feedbacks of all activated DL SPS configurations and determines SPS release for all the activated DL SPS configurations. In yet another implementation, the UE counts the number of missing HARQ-ACK feedbacks per a subset of activated DL SPS configurations, and determines SPS release individually for the subset of activated DL SPS configurations.

gNB may also count the number of missed HARQ-ACK transmissions from the UE. The number of missed HARQ-ACK transmissions from the UE counted by gNB is expected to be equal to or larger than the number of missing HARQ-ACK feedbacks of the UE, considering that gNB could miss detecting some of HARQ-ACK feedbacks transmitted by the UE (i.e. DTX detection). If the number of missed HARQ-ACK transmissions counted by gNB is larger than the number of actually missing HARQ-ACK feedbacks of the UE, gNB can send a DL SPS release PDCCH before the UE performs autonomous DL SPS release. Thus, the gNB's threshold of number of missed HARQ-ACK can be exceeded prior to UE's threshold of number of missed HARQ-ACK, and the gNB can send a DL SPS release PDCCH before the UE can trigger autonomous DL SPS release. With SPS release of one or more activated DL SPS configurations on a current active BWP of a cell, gNB may activate another DL SPS configuration on a different carrier/cell which can provide more UL resources for HARQ-ACK feedback.

In one implementation, a UE receives an indication of a maximum allowed number of SPS PDSCHs of a DL SPS configuration for which the UE can aggregate HARQ-ACK information and transmit the aggregated HARQ-ACK information in one uplink channel (e.g. PUCCH or PUSCH) if the UE delays one or more HARQ-ACK feedbacks corresponding to one or more SPS PDSCHs of the DL SPS configuration. The indication of the maximum allowed number of SPS PDSCHs for aggregated HARQ-ACK feedback can be received via an RRC message including the DL SPS configuration (e.g. as a part of DL SPS configuration parameters) or via DL SPS activation DCI. In addition, the UE receives an indication of PDSCH-to-HARQ timing (e.g. via a PDSCH-to-HARQ timing indicator field in an SPS activation DCI format) that defines an initial PUCCH occasion for HARQ-ACK feedback. The UE can determine a set of PUCCH occasions for potential HARQ-ACK feedback to a SPS PDSCH of the DL SPS configuration based on the maximum number of SPS PDSCHs of the DL SPS configuration for the aggregated HARQ-ACK feedback and the PDSCH-to-HARQ timing applicable if performing HARQ-ACK feedback without additional delay.

A configured PUCCH resource (i.e. the initial PUCCH occasion) for HARQ-ACK feedback to a given SPS PDSCH is determined based on a RRC configured PUCCH resource index and the semi-persistently configured (via SPS activation DCI) PDSCH-to-HARQ timing. The configured PUCCH resource may not be available because of partial or full overlapping with semi-statically configured DL symbols (and semi-statically configured "Flexible" symbols if the UE does not detect DCI format 2_0 including a slot format indication) and/or dynamically indicated DL or "Flexible" symbols (e.g. indicated by an SFI-index field value in DCI format 2_0). If the configured PUCCH resource is not available for HARQ-ACK transmission, the UE can delay HARQ-ACK transmission up to following 'X' HARQ-ACK transmission occasions (i.e. PUCCH occasions) of the DL SPS configuration, where 'X' is determined based on the indicated maximum allowed number of SPS PDSCHs of the DL SPS configuration for aggregated HARQ-ACK feedback.

In another implementation, a UE receives an indication of a maximum allowed number of HARQ-ACK PUCCH occasions of a plurality of DL SPS configurations with the same priority for delayed HARQ-ACK feedback of a SPS PDSCH of the plurality of DL SPS configurations. The UE can transmit the HARQ-ACK feedback of the SPS PDSCH in one PUCCH occasion selected from the maximum allowed number of HARQ-ACK PUCCH occasions (e.g. selecting the earliest available PUCCH occasion). The indication of the maximum number of HARQ-ACK PUCCH occasions can be received via an RRC message or via DL SPS activation DCI.

In other implementations, a UE receives an indication of a minimum PDSCH-to-HARQ feedback delay and a maximum PDSCH-to-HARQ feedback delay and identifies the earliest available HARQ-ACK PUCCH occasion that starts no later than the maximum PDSCH-to-HARQ feedback delay but later than the minimum PDSCH-to-HARQ feedback delay. The indication of the minimum PDSCH-to-HARQ feedback delay and the maximum PDSCH-to-HARQ feedback delay can be received via an RRC message and/or via DL SPS activation DCI.

According to another embodiment, a UE may semi-statically (via RRC configuration) or semi-persistently (via SPS activation DCI) receive an indication of a maximum number of NACK feedbacks and configuration information of a time window. The UE may further count the number of SPS PDSCHs for which the UE generates NACK information within the semi-statically or semi-persistently configured time window. If the number of SPS PDSCHs with NACK feedback is larger than the indicated maximum number of NACK feedbacks, the UE may autonomously release SPS for one or more associated DL SPS configurations.

In one implementation, the UE counts the number of NACK feedbacks per DL SPS configuration, and determines SPS release individually for each DL SPS configuration. In another implementation, the UE counts the number of NACK feedbacks of all activated DL SPS configurations and determines SPS release for all the activated DL SPS configurations. In yet another implementation, the UE counts the number of NACK feedbacks per a subset of activated DL SPS configurations, and determines SPS release individually for the subset of activated DL SPS configurations. In other implementations, the time window is a sliding time window, and multiple time windows may overlap with each other, where the UE may maintain multiple counters for NACK feedbacks at a given time.

With SPS release of one or more activated DL SPS configurations on a current active BWP of a cell, gNB may reactivate the one or more DL SPS configurations and/or may activate another DL SPS configuration on a same or different BWP/cell with different MCS to increase the link reliability.

According to other embodiments, a UE is configured with a plurality of PUCCH carriers for HARQ-ACK feedback of SPS PDSCHs of one or more DL SPS configurations in a DL BWP. For example, one PUCCH carrier is a TDD carrier including the activated one or more DL SPS configurations, and the other PUCCH carrier is a supplementary uplink carrier (e.g. an uplink carrier of paired spectrum). Furthermore, the UE receives indication of a plurality of PUCCH resource sets, each PUCCH resource set associated with each of the plurality of PUCCH carriers for HARQ-ACK feedback of SPS PDSCHs of the one or more DL SPS configurations in the DL BWP. The UE selects a PUCCH carrier and a corresponding PUCCH resource set from the indicated plurality of PUCCH resource sets based on availability of each PUCCH resource set of the plurality of PUCCH resource sets and priorities among the configured PUCCH carriers (or PUCCH resource set priorities among the configured PUCCH resource sets). The UE may further select a PUCCH resource from the selected PUCCH resource set based on HARQ-ACK payload size.

In another embodiment, an indicated slot format of a slot could be same or different across different carriers. The UE may choose to transmit HARQ-ACK feedback in one of the configured PUCCH carriers within the maximum allowed HARQ-ACK feedback delay where the uplink symbol is available at the earliest. The gNB monitors HARQ feedback from UE for the DL SPS in one or more configured PUCCH resources associated with one or more PUCCH carriers and does not schedule re-transmission for that HARQ process id(s) of the DL SPS or subset of DL SPS if it receives HARQ-ACK feedback from one of the above PUCCH resources. In another implementation, if the UE choose to transmit HARQ feedback in the plurality of associated PUCCH resources to get diversity gain, and if gNB decodes/detects ACK from at least one of the one or more PUCCH resources associated with the same DL SPS configuration, then the gNB does not schedule re-transmission.

According to another embodiment, a UE receives an indication of the number of SPS PDSCHs of a group of SPS PDSCHs of a DL SPS configuration, where HARQ-ACK information bits of the group of SPS PDSCHs of the DL SPS configuration are multiplexed and transmitted in a HARQ-ACK transmission occasion. The UE further receives an indication of PDSCH-to-HARQ timing (e.g. via a PDSCH-to-HARQ timing indicator field in an SPS activation DCI format) and interprets the indicated PDSCH-to-HARQ timing as a delay from a slot (or a sub-slot) where the earliest starting SPS PDSCH of the group of SPS PDSCHs ends to a slot (or a sub-slot) where the HARQ-ACK transmission occasion (i.e. PUCCH occasion) belongs to. The UE is not expected that the start of the HARQ-ACK transmission occasion is before a symbol starting after an applicable minimum PDSCH processing time after the ending time of the last SPS PDSCH of the group of SPS PDSCHs. An aggregated HARQ-ACK feedback for the group of SPS PDSCHs may reduce a PUCCH resource overhead for HARQ-ACK feedback and make it easier for a network entity to better guarantee availability of HARQ-ACK feedback occasions for the DL SPS configuration.

In another embodiment, the mismatch between SPS and the traffic arrival time could also be a one reason for the message reception failure and due to short survival time, gNB could activate multiple UL SPS occasions for the UE and monitors PUSCH transmission from UE and does not schedule re-transmission if it decode PUSCH in one of them.

In another embodiment, DL SPS and UL SPS associated with one QoS flow or radio bearer may be configured as set or subset and it could be jointly activated or deactivated/released. UE could be configured with plurality of above set or subset in the same or different carriers/TRPs- or antenna panels/beams.

In one embodiment, UE should not declare RLF after the expiry of survival time or consecutive PDSCH CRC failures and the T310 timer should be longer than survival time.

In some examples, the gNB triggers assignment of additional resources to the UE to improve communication reliability after receiving consecutive HARQ-non-acknowledgements (NACKs) from UE.

According to another embodiment, gNB after receiving consecutive HARQ-NACKs from the UE could activate SPS configuration in same or another carrier for the UE, wherein the consecutive number of NACKs should be less than the survival time for this QoS flow/radio bearer. In one example, this DL SPS is activated in a BWP in another carrier, which had better coverage where the UE may receive multiple SPS configuration from same or multiple carrier at the same time.

In another embodiment, gNB after consecutive PUSCH CRC failures in the uplink, could activate another UL SPS configuration for the UE in the same or different carrier for the UE, where in the consecutive number of CRC failure should be less than the survival time for this QoS flow/radio bearer.

In another embodiment, gNB after receiving consecutive HARQ-NACKs from UE could activate SPS configuration in another transmission and reception point (TRP), where the TRP could also be activated at the same time and the configuration of the SPS and TCI states could be transmitted together (multi-TRP or multi-beam transmission).

In another embodiment, UE implicitly/autonomously activate multiple antenna panels/beams after consecutive PDSCH cyclic redundancy check (CRC) failures or after receiving NACKs from gNB or beam failure. The number of consecutive CRC failures or NACKs to activate the antenna panel could be signaled by gNB. UL SPS configuration could also be activated on each antenna panel/beam of the UE.

In another embodiment, UE enables selective duplication of data from multiple activated antenna panels/beams after receiving non-toggled new data indicator (NDI) in the UL grant or CRC failure.

The gNB can duplicate the same TB in one or more SPS PDSCHs of one or more active DL SPS configurations. If UE successfully decodes at least one SPS PDSCH(s) of the one or more SPS PDSCHs which are associated with the one or more active DL SPS configurations, the UE may transmit an ACK in a configured PUCCH resource. In another example, the UE may transmit an ACK even if one of SPS PDSCHs is not successfully decoded in order to avoid unnecessary re-transmission. The UE may transmit a NACK only if all associated SPS PDSCH(s) are not successfully decoded.

One or more combination of above embodiment is also possible.

In some embodiments, a UE antenna panel may be a physical or logical antenna array comprising a set of antenna elements or antenna ports that share a common or a significant portion of an RF chain (e.g., in-phase/quadrature (I/Q) modulator, analog to digital (A/D) converter, local oscillator, phase shift network). The UE antenna panel or "UE panel" may be a logical entity with physical UE antennas mapped to the logical entity. The mapping of physical UE antennas to the logical entity may be up to UE implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the UE associated with the antenna panel (including power amplifier/low noise amplifier (LNA) power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on UE's own implementation, a "UE panel" can have at least one of the following functionalities as an operational role of the unit of antenna group to control its Tx beam independently, unit of antenna group to control its transmission power independently, unit of antenna group to control its transmission timing independently. The "UE panel" may be transparent to gNB. For certain condition(s), the gNB or the network can assume the mapping between the UE's physical antennas to the logical entity "UE panel" may not be changed. For example, the condition may include until the next update or report from UE or may comprise a duration of time over which the gNB assumes there will be no change to the mapping. The UE may report its UE capability with respect to the "UE panel" to the gNB or network. The UE capability may include at least the number of "UE panels". In one implementation, the UE may support UL transmission from one beam within a panel; with multiple panels, more than one beam (one beam per panel) may be used for UL transmission. In another implementation, more than one beam per panel may be supported/used for UL transmission.

In accordance with at least some embodiments, procedures and methods to provide HARQ-ACK feedback to SPS PDSCHs of one or more DL SPS configurations with short periodicities have been proposed, with considering assurance of communication service availability for periodic deterministic communication services.

In dynamic TDD, the gNB may configure a UE with the maximum allowed time duration of delaying HARQ-ACK feedback for a given SPS PDSCH, taking into account survival time of applications and end-to-end latency.

If the UE cannot transmit HARQ-ACK information within the semi-statically or semi-persistently configured maximum HARQ-ACK feedback delay, the UE discards the HARQ-ACK information.

The UE may receive an indication of a maximum number of missing HARQ-ACK feedbacks and count the number of SPS PDSCHs of one or more associated activated DL SPS configurations for which the UE were not able to perform HARQ-ACK transmissions within the configured maximum HARQ-ACK feedback delay. If the number of missing HARQ-ACK feedbacks is larger than the indicated maximum number of missing HARQ-ACK feedbacks, the UE may autonomously release SPS for the one or more associated activated DL SPS configurations.

UE is configured with a plurality of PUCCH carriers for HARQ-ACK feedback of SPS PDSCHs of activated one or more DL SPS configurations in a given DL BWP. Further, the UE receives indications of a plurality of PUCCH resources associated with the plurality of PUCCH carriers, and selects a PUCCH resource from the indicated plurality of PUCCH resources based on availability of each of the plurality of PUCCH resources and priorities among the configured PUCCH carriers (or PUCCH resource priorities among the configured PUCCH resources).

Figure 4:
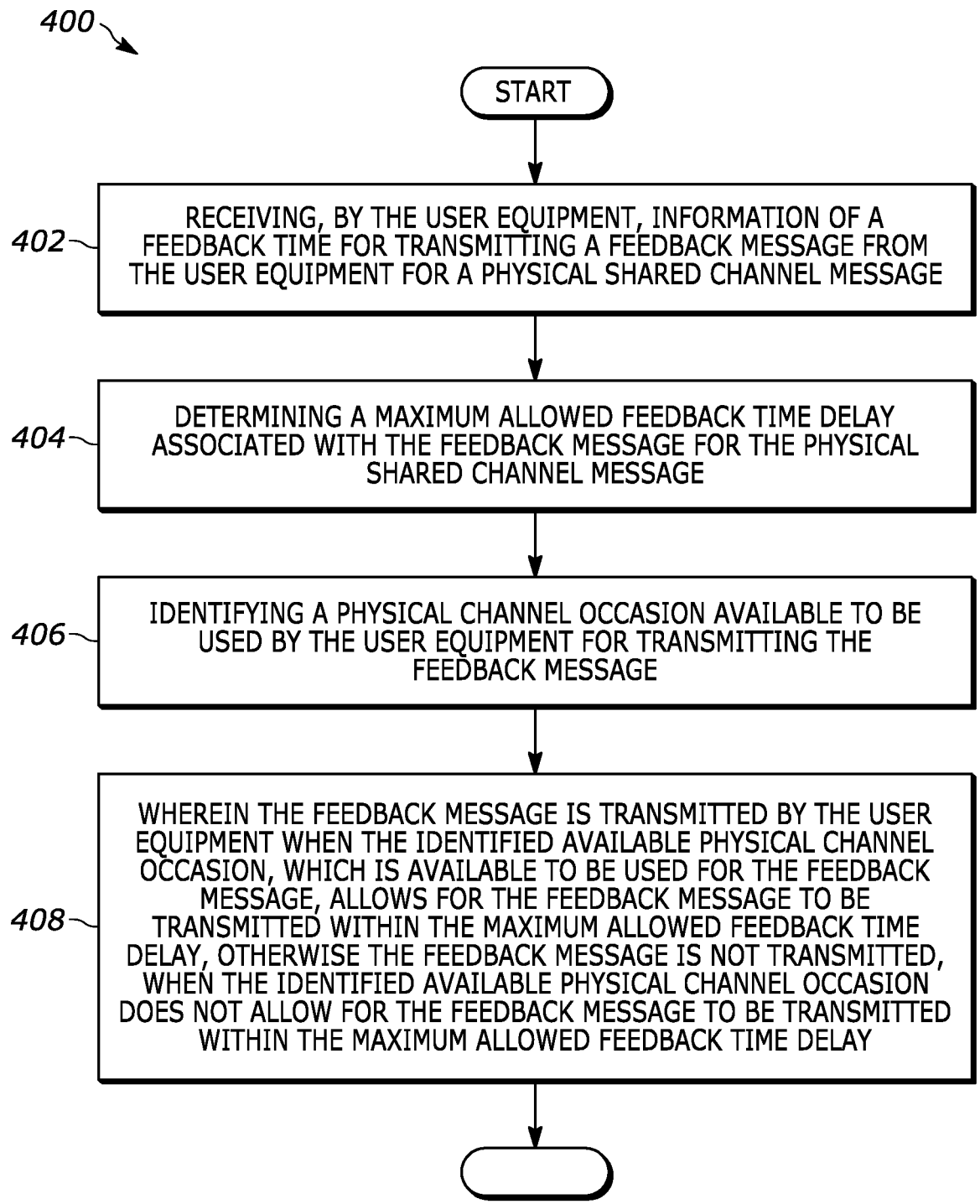
FIG. 4 is a flow diagram in a user equipment for managing the transmission of a feedback message.

FIG. 4 illustrates a flow diagram 400 of a method in a user equipment. The method includes receiving 402, by the user equipment, information of a feedback time for transmitting a feedback message from the user equipment for a physical shared channel message. A maximum allowed feedback time delay associated with the feedback message for the physical shared channel message can be determined 404. A physical channel occasion available to be used by the user equipment for transmitting the feedback message can be identified 406. The feedback message is transmitted by the user equipment when the identified available physical channel occasion, which is available to be used for the feedback message, allows for the feedback message to be transmitted within the maximum allowed feedback time delay, otherwise the feedback message is not transmitted, when the identified available physical channel occasion does not allow for the feedback message to be transmitted within the maximum allowed feedback time delay 408.

In some instances, the maximum allowed feedback time delay and the feedback time can be used to identify a time window within which a physical channel occasion can be selected which allows for the feedback to be transmitted. In some of these instances, the method can further include delaying a transmission of the feedback message for the physical shared channel message within the time window that has been identified, when a physical channel occasion corresponding to the feedback time is not available.

In some instances, the identified available physical channel occasion is a physical uplink control channel occasion comprising only one or more uplink symbols.

In some instances, the method can further include receiving information of a number of physical shared channels for which feedback information is aggregated, wherein the feedback message comprises the aggregated feedback information corresponding to the physical shared channels.

In some instances, the method can further include receiving information of a delay with respect to the feedback time, wherein the maximum allowed feedback time delay for transmitting the feedback message can be determined based on the feedback time and the delay with respect to the feedback time. In some of these instances, the information of the delay can be received in a related feedback timing indicator field as part of the received information of the feedback time.

In some instances, the feedback message can include at least one hybrid automatic repeat request acknowledgement.

In some instances, the feedback message can be for a semi-persistent scheduling physical downlink shared channel, where the semi-persistent scheduling physical downlink shared channel can be scheduled according to semi-persistent scheduling information associated with a downlink semi persistent scheduling configuration. In some of these instances, the maximum allowed feedback time delay is determined based on an expected periodicity of a plurality of semi-persistent scheduling physical downlink shared channels related to the downlink semi persistent scheduling configuration. In some of these and other instances, the physical channel occasion, that can be identified, can be an earliest available physical uplink control channel occasion of one or more physical uplink control channel occasions of the downlink semi-persistent scheduling configuration, where the one or more physical uplink control channel occasions can occur after the feedback time, but before the maximum allowed feedback time delay. In some of these and other instances, the physical channel occasion, that can be identified, can be an earliest available physical uplink control channel occasion of one or more physical uplink control channel occasions of one or more downlink semi-persistent scheduling configurations including the downlink semi-persistent scheduling configuration, where the one or more physical uplink control channel occasions can occur after the feedback time, but before the maximum allowed feedback time delay. In some of these and other instances, the user equipment can maintain a count of the number of feedback messages associated with a plurality of semi-persistent scheduling physical downlink shared channels of the downlink semi persistent scheduling configuration that have not been transmitted, and when the count exceeds a predetermined maximum number of missing feedback messages, the user equipment can autonomously release the semi-persistent scheduling information associated with the downlink semi persistent scheduling configuration.

In some instances, the user equipment can be configured with a plurality of physical uplink control channel carriers for transmitting the feedback message. In some of these instances, the user equipment can receive information of a plurality of physical uplink control channel resources associated with the plurality of physical uplink control channel carriers, where each of the plurality of physical uplink control channel resources can be determined based on a radio resource control configured physical uplink control channel resource index.

Figure 5:
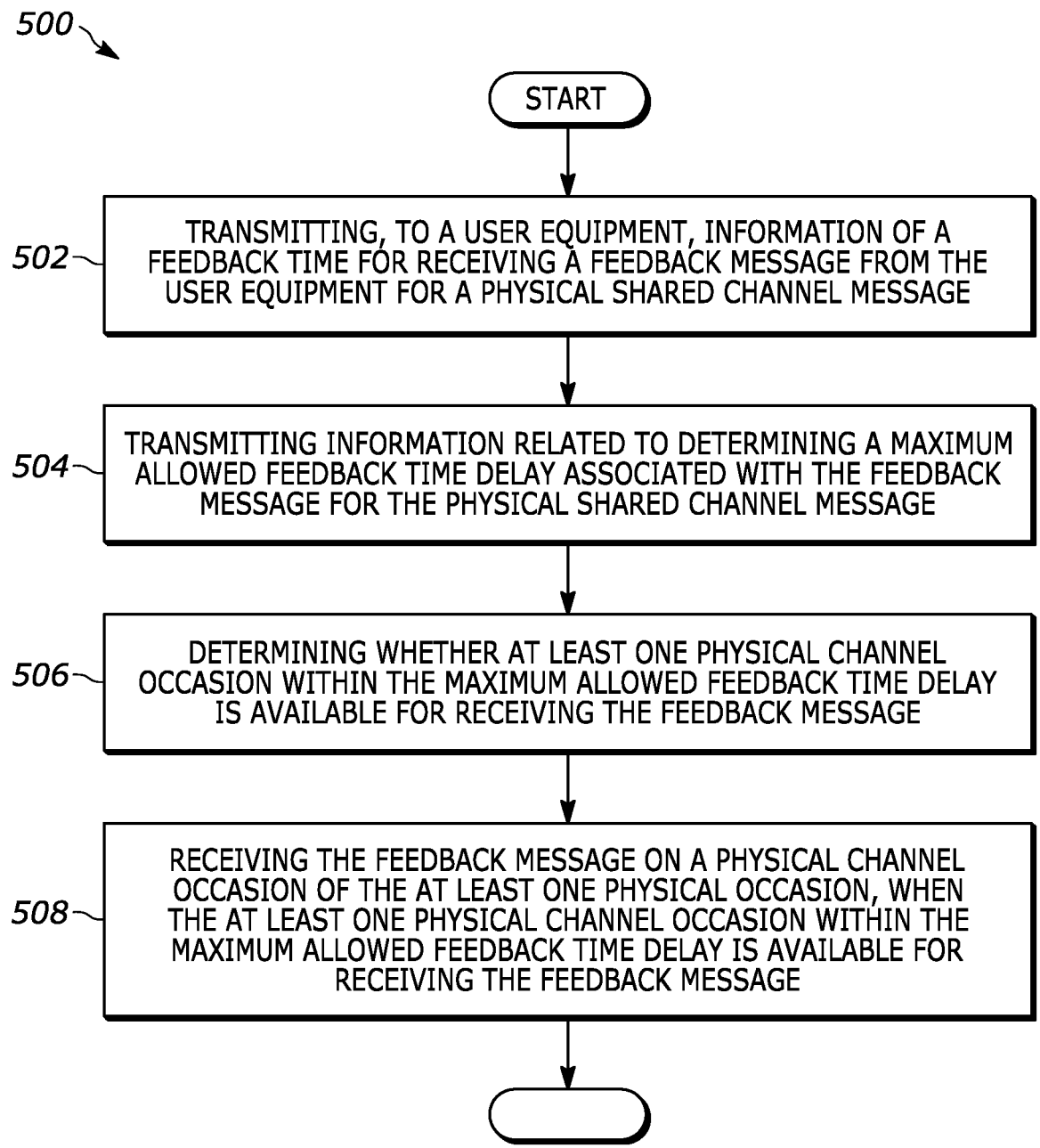
FIG. 5 is a flow diagram in a network entity for managing the receipt of a feedback message.

FIG. 5 illustrates a flow diagram 500 of a method in a network entity. The method includes transmitting 502, to a user equipment, information of a feedback time for receiving a feedback message from the user equipment for a physical shared channel message. Information related to determining a maximum allowed feedback time delay associated with the feedback message for the physical shared channel message is transmitted 504. A determination 506 is made as to whether at least one physical channel occasion within the maximum allowed feedback time delay is available for receiving the feedback message. The feedback message is received 508 on a physical channel occasion of the at least one physical occasion, when the at least one physical channel occasion within the maximum allowed feedback time delay is available for receiving the feedback message.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, or other network entity, can perform reciprocal operations of a UE. For example, the network entity can transmit signals received by the UE and can receive signals transmitted by the UE. The network entity can also process and operate on sent and received signals.

Figure 6:
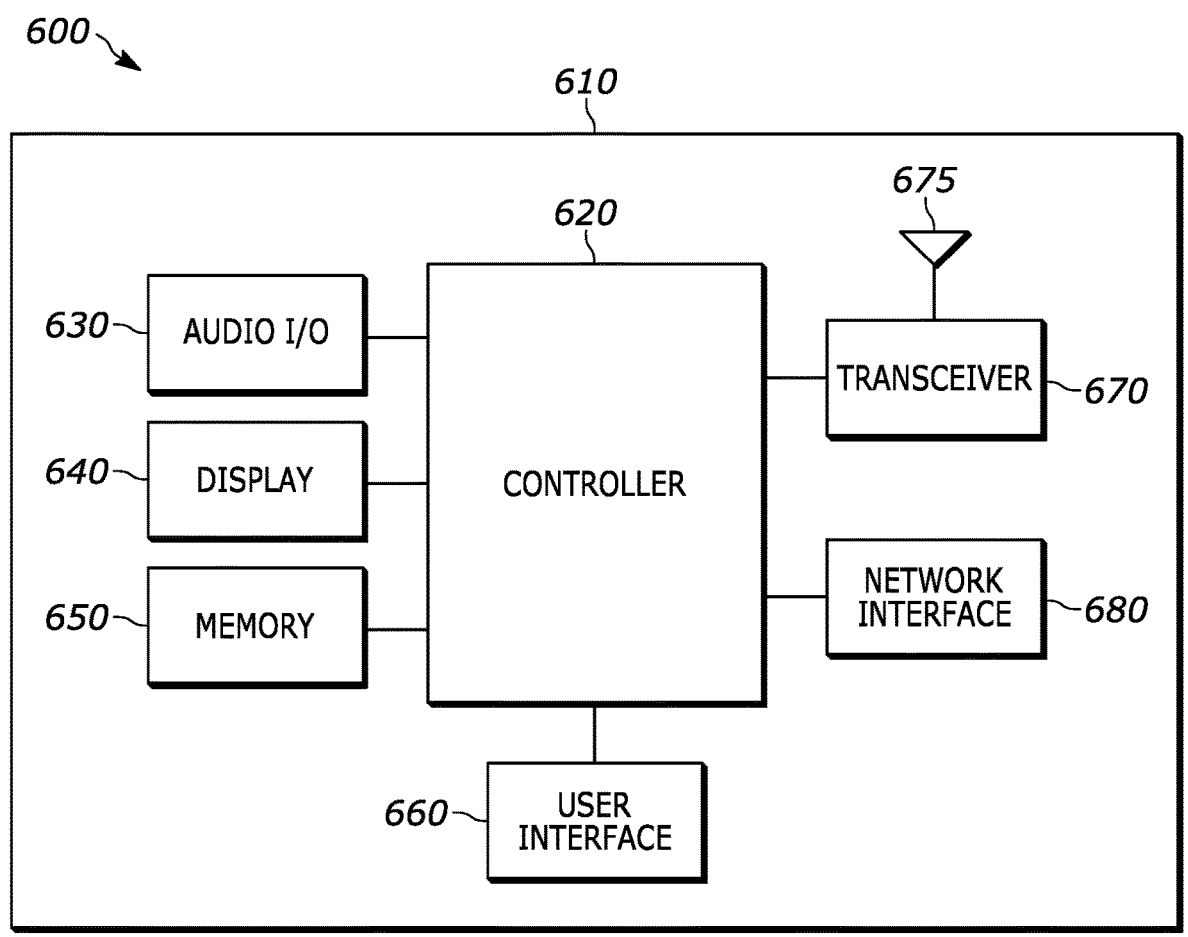
FIG. 6 is an example block diagram of an apparatus according to a possible embodiment.

FIG. 6 is an example block diagram of an apparatus 600, such as the user equipment 110, the network entity 120, or any other wireless communication device disclosed herein, according to a possible embodiment. The apparatus 600 can include a housing 610, a controller 620 coupled to the housing 610, audio input and output circuitry 630 coupled to the controller 620, a display 640 coupled to the controller 620, a memory 650 coupled to the controller 620, a user interface 660 coupled to the controller 620, a transceiver 670 coupled to the controller 620, at least one antenna 675 coupled to the transceiver 670, and a network interface 680 coupled to the controller 620. The apparatus 600 may not necessarily include all of the illustrated elements and/or may include additional elements for different embodiments of the present disclosure. The apparatus 600 can perform the methods described in all the embodiments The display 640 can be a viewfinder, a liquid crystal display (LCD), a light emitting diode (LED) display, an Organic Light Emitting Diode (OLED) display, a plasma display, a projection display, a touch screen, or any other device that displays information. The transceiver 670 can be one or more transceivers that can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 650 can include a random access memory (RAM), a read only memory (ROM), an optical memory, a solid state memory, a flash memory, a removable memory, a hard drive, a cache, or any other memory that can be coupled to an apparatus.

The apparatus 600 or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 650 or elsewhere on the apparatus 600, in cloud storage, and/or anywhere else that can store software and/or an operating system. The apparatus 600 or the controller 620 may also use hardware to implement disclosed operations. For example, the controller 620 may be any programmable processor. Furthermore, the controller 620 may perform some or all of the disclosed operations. For example, some operations can be performed using cloud computing and the controller 620 may perform other operations. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method performed by a user equipment (UE), the method comprising:
   receiving information of a feedback time for transmitting a feedback message from the UE for a physical shared channel message;
   determining a maximum allowed feedback time delay associated with the feedback message for the physical shared channel message in accordance with a downlink semi-persistent scheduling configuration associated with the physical shared channel message; and
   identifying a physical channel occasion available to the UE to transmit the feedback message in accordance with the downlink semi-persistent scheduling configuration, wherein one of the feedback message is transmitted by the UE when the physical channel occasion, which is identified as available, allows for the feedback message to be transmitted within the maximum allowed feedback time delay, or the feedback message is not transmitted if the physical channel occasion does not allow for the feedback message to be transmitted within the maximum allowed feedback time delay.

2. The method according to claim 1, wherein the maximum allowed feedback time delay and the feedback time are used to identify a time window within which a physical channel occasion can be selected which allows for the feedback message to be transmitted.

3. The method according to claim 2, further comprising delaying a transmission of the feedback message for the physical shared channel message within the time window that has been identified, when a physical channel occasion corresponding to the feedback time is not available.

4. The method according to claim 1, wherein the identified available physical channel occasion is a physical uplink control channel occasion comprising only one or more uplink symbols.

5. The method according to claim 1, further comprising receiving information of a number of physical shared channels for which feedback information is aggregated, wherein the feedback message comprises the aggregated feedback information corresponding to the physical shared channels.

6. The method according to claim 1, further comprising receiving information of a delay with respect to the feedback time,
   wherein the maximum allowed feedback time delay for transmitting the feedback message is determined based on the feedback time and the delay with respect to the feedback time.

7. The method according to claim 6, where the information of the delay is received in a related feedback timing indicator field as part of the received information of the feedback time.

8. The method according to claim 1, wherein the feedback message includes at least one hybrid automatic repeat request acknowledgement.

9. The method according to claim 1, wherein the feedback message is for a semi-persistent scheduling physical downlink shared channel, where the semi-persistent scheduling physical downlink shared channel is scheduled according to semi-persistent scheduling information associated with a downlink semi persistent scheduling configuration.

10. The method according to claim 9, wherein the maximum allowed feedback time delay is determined based on an expected periodicity of a plurality of semi-persistent scheduling physical downlink shared channels related to the downlink semi persistent scheduling configuration.

11. The method according to claim 9, wherein the physical channel occasion, that is identified, is an earliest available physical uplink control channel occasion of one or more physical uplink control channel occasions of one or more downlink semi-persistent scheduling configurations including the downlink semi-persistent scheduling configuration, where the one or more physical uplink control channel occasions occur after the feedback time, but before the maximum allowed feedback time delay.

12. The method according to claim 9, further comprising:
   maintaining a count of a number of feedback messages associated with a plurality of semi-persistent scheduling physical downlink shared channels of the downlink semi persistent scheduling configuration that have not been transmitted; and
   if the count exceeds a predetermined maximum number of missing feedback messages, autonomously releasing the semi-persistent scheduling information associated with the downlink semi persistent scheduling configuration.

13. The method according to claim 1, wherein the UE is configured with a plurality of physical uplink control channel carriers for transmitting the feedback message.

14. The method according to claim 13, further comprising receiving information of a plurality of physical uplink control channel resources associated with the plurality of physical uplink control channel carriers, where each of the plurality of physical uplink control channel resources is determined based on a radio resource control configured physical uplink control channel resource index.

15. A user equipment (UE) for wireless communication comprising:
   at least one memory; and
   at least one processor coupled with the at least one memory and configured to cause the UE to:
   receive information of a feedback time for transmitting a feedback message from the UE for a physical shared channel message; and
   determine a maximum allowed feedback time delay associated with the feedback message for the physical shared channel message in accordance with a downlink semi-persistent scheduling configuration associated with the physical shared channel message; and
   identify a physical channel occasion available to the UE to transmit the feedback message in accordance with the downlink semi-persistent scheduling configuration, wherein one of the feedback message is transmitted via the transceiver of the UE when the physical channel occasion, which is identified as available, allows for the feedback message to be transmitted within the maximum allowed feedback time delay, or the feedback message is not transmitted if the physical channel occasion does not allow for the feedback message to be transmitted within the maximum allowed feedback time delay.

16. The UE according to claim 15, wherein the maximum allowed feedback time delay and the feedback time are used to identify a time window within which a physical channel occasion can be selected which allows for the feedback message to be transmitted.

17. The UE according to claim 16, wherein the at least one processor is configured to cause the UE to delay a transmission of the feedback message for the physical shared channel message within the time window that has been identified, when a physical channel occasion corresponding to the feedback time is not available.

18. The UE according to claim 15, wherein the feedback message is for a semi-persistent scheduling physical downlink shared channel, where the semi-persistent scheduling physical downlink shared channel is scheduled according to semi-persistent scheduling information associated with a downlink semi persistent scheduling configuration.

19. The UE according to claim 18, wherein the at least one processor is configured to cause the UE to:
- maintain a count of a number of feedback messages associated with a plurality of semi-persistent scheduling physical downlink shared channels of the downlink semi persistent scheduling configuration that have not been transmitted; and
- if the count exceeds a predetermined maximum number of missing feedback messages, autonomously release the semi-persistent scheduling information associated with the downlink semi persistent scheduling configuration.

20. A processor for wireless communication, comprising:
at least one controller coupled with at least one memory and configured to cause the processor to:
- receive information of a feedback time for transmitting a feedback message for a physical shared channel message;
- determine a maximum allowed feedback time delay associated with the feedback message for the physical shared channel message in accordance with a downlink semi-persistent scheduling configuration associated with the physical shared channel message; and
- identify a physical channel occasion available to transmit the feedback message in accordance with the downlink semi-persistent scheduling configuration, wherein one of the feedback message is transmitted when the physical channel occasion, which is identified as available, allows for the feedback message to be transmitted within the maximum allowed feedback time delay, or the feedback message is not transmitted if the physical channel occasion does not allow for the feedback message to be transmitted within the maximum allowed feedback time delay.

* * * * *